(12) United States Patent
Hurst

(10) Patent No.: US 6,763,067 B2
(45) Date of Patent: Jul. 13, 2004

(54) RATE CONTROL FOR BITSTREAM RE-ENCODING

(75) Inventor: Robert N. Hurst, Hopewell, NJ (US)

(73) Assignee: Sarnoff Corporation, Princeton, NJ (US)

(*) Notice: Subject to any disclaimer, the term of this patent is extended or adjusted under 35 U.S.C. 154(b) by 290 days.

(21) Appl. No.: 09/973,643

(22) Filed: Oct. 9, 2001

(65) Prior Publication Data

US 2002/0067768 A1 Jun. 6, 2002

Related U.S. Application Data

(60) Provisional application No. 60/238,979, filed on Oct. 10, 2000.

(51) Int. Cl.[7] ................................................ H04N 7/12
(52) U.S. Cl. ............................ 375/240.03; 375/240.06
(58) Field of Search ........................ 375/240.01, 240.03, 375/240.02–240.07, 240.12–240.17, 240.23–240.26

(56) References Cited

U.S. PATENT DOCUMENTS

| | | | | | |
|---|---|---|---|---|---|
| 6,023,553 | A | * | 2/2000 | Boyce et al. ............... | 386/109 |
| 6,181,743 | B1 | * | 1/2001 | Bailleul ....................... | 375/240 |
| 6,226,326 | B1 | * | 5/2001 | Mihara ................... | 375/240.05 |
| 6,310,915 | B1 | * | 10/2001 | Wells et al. ........... | 375/240.03 |
| 6,493,388 | B1 | * | 12/2002 | Wang .................... | 375/240.12 |
| 6,587,508 | B1 | * | 7/2003 | Hanamura et al. ..... | 375/240.24 |
| 2002/0181595 | A1 | * | 12/2002 | Obata et al. ........... | 375/240.25 |

FOREIGN PATENT DOCUMENTS

| | | |
|---|---|---|
| EP | 0 739 138 A | 10/1996 |
| EP | 0 977 439 A | 2/2000 |
| WO | WO 00 46997 A | 8/2000 |
| WO | WO 00 51357 A | 8/2000 |

\* cited by examiner

*Primary Examiner*—Chris Kelley
*Assistant Examiner*—Dave Czekaj
(74) *Attorney, Agent, or Firm*—William J. Burke, Esq.

(57) ABSTRACT

Processing is applied to convert an input compressed video bitstream into an output compressed video bitstream having a different bit rate and/or representing different imagery from the input bitstream. The bitstream conversion processing is adjusted based on control parameters that are generated by comparing analogous measurements made to the input and output bitstreams so that subsequent measurements of the output bitstream will more closely match subsequent measurements of the input bitstream. In certain embodiments, the bitstream conversion processing involves decoding the input bitstream, optionally applying image processing functions to the resulting decoded video data, and re-encoding the resulting processed video data to generate the output bitstream. In one embodiment, the quantization data used during quantization of DCT coefficients during the re-encoding process are scaled using quantization re-scale factors (QRFs) generated by comparing the arrival margin for each frame in the input bitstream to the arrival margin for the corresponding frame in the output bitstream, where the arrival margin is defined as the amount of time between when the last bit of a frame has entered the decode buffer and when that frame is removed from the buffer.

18 Claims, 7 Drawing Sheets

```
1   foreach (frame)
2   {
3       //OVERALL FULLNESS AND DELAY
4       ForD=targetPercentFullnessOrDelay—Peak;//error in buffer fullness or delay
5       if (forD > 0)
6           ForD_Integ+=ForD * gainErrorFullnessOrDelayIntegratorUp;
7       else
8           ForD_Integ+=ForD * gainErrorFullnessOrDelayIntegratorDown;
9       if(ForD_Integ < 0) ForD_Integ=0;   // integrated fullness/delay error is non-negative
10
11      // ARRIVAL MARGIN DIFFERENCE
12      AMin = Arrival Margin of input frame (n) from VBV model;
13      AMout = Arrival Margin of output frame (n) from VBV model;
14      AMDiff = AMin — AMout
15      AMDiff_Integ+=gainArrivalMarginDifferenceIntegrator * AMDiff;
16      if (AMDiff_Integ < 1) AMDiff_Integ = 1;
17
18      // ARRIVAL MARGIN PANIC
19      AMPanic = arrivalMarginPanicThreshold — AMout;
20      AMPanic_Integ+= AMPanic * gainErrorArrivalMarginPanicIntegrator;
21      if (AMPanicInteg <0) AMPanicInteg = 0;
22      if (AMPanic <0) AMPanic = 0;
23
24      // SUMMATION TO GET QRF
25      QRF = AMDiff_Integ
26          + gainArrivalMarginDifferenceDirect * AMDiff
27          + AMPanic * gainErrorArrivalMarginPanicDirect
28          + AMPanicInteg
29          + ForD * gainErrorFullnessOrDelayDirect
30          + ForD_Integ;
31      if (QRF < 1.0) QRF = 1.0;
32  }
```

*FIG. 3*

RATE CONTROL FOR BITSTREAM RE-ENCODING

CROSS-REFERENCE TO RELATED APPLICATIONS

This application claims the benefit of the filing date of U.S. provisional application No. 60/238,979, filed on Oct. 10, 2000.

STATEMENT REGARDING FEDERALLY SPONSORED RESEARCH OR DEVELOPMENT

The Government of the United States of America has rights in this invention pursuant to NIST Contract No. 70NANB5H1174 awarded by the National Institute of Standards and Technology.

BACKGROUND OF THE INVENTION

1. Field of the Invention

The present invention relates to video processing, and, in particular, to processing existing compressed video bitstreams to generate altered bitstreams.

2. Description of the Related Art

MPEG (Motion Picture Experts Group) and MPEG-like compression systems create a stream of bits wherein successive frames do not contain equal numbers of bits. This requires that decoders have a bitstream buffer at their inputs, and it requires encoders to generate bitstreams that avoid overflowing or underflowing the decoder buffers. MPEG-2 13818-2 Annex C (Normative) describes a buffer model (referred to as the VBV (video buffering verifier) model) that conforming bitstreams must neither overflow nor underflow. A bitstream that overflows or underflows the VBV buffer is not compliant with the standard. The process by which an encoder creates a bitstream constrained to comply with these buffer requirements is commonly known as "rate control."

Many rate control schemes have been developed. Most are variations of the widely-known "TM5" (Test Model 5) developed during the standardization of MPEG-2. In TM5, rate control has three main steps. The first is budgeting or allocating a certain number of bits for the next picture (based on the intended GOP (group of pictures) structure and the current relative complexity of the three picture coding types (I, P, and B). The second is creating a quantizer scale value that is adjusted macroblock by macroblock based on how the previous macroblocks in the picture have or have not stayed on budget. The third is to modify this quantizer scale value based on psychovisual error masking principles. When the current picture is completely coded, the extent that the target bitcount for the picture was missed is added to or subtracted from the number of bits available to code the remaining pictures in the GOP. At the end of the current GOP, the extent that the target bitcount for the GOP was missed is added to or subtracted from the allocation for the next GOP.

There exists a need to change the bit rate characteristic of existing compressed video bitstreams such that a bitstream is received and converted to a different (usually lower) bit rate. Examples of this include (a) reducing a 45-Mbps (megabits per second) network distribution stream to a 19.39-Mbps ATSC broadcast stream, (b) inserting a logo into a 4-Mbps stream, thus increasing the information load, while maintaining the 4-Mbps bit rate, (c) restructuring the mix of multiple streams in a multiplex (e.g., fitting a 5-Mbps stream into a 4-Mbps channel), and (d) simply reducing the bit rate of a bitstream so that other data may be sent at the same time over a channel having limited bandwidth. In each of these situations, there are two conflicting goals: first, maintaining compliance by avoiding overflow or underflow of the buffer, and, second, maintaining maximum quality by making full use of the buffer size available.

TM5 and similar rate control schemes presuppose that the encoder has control over the GOP structure; that is, the encoder chooses the sequence of picture coding types. When processing an existing compressed video bitstream (e.g., inserting a logo into an existing bitstream by decoding, inserting, and then re-encoding), the best picture quality is typically obtained by using the same sequence of picture coding types. This means, however, that the GOP structure is determined by the incoming bitstream, not by the re-encoder. As such, the GOP and picture bit targeting approach of TM5 and similar rate control schemes will not adequately work when processing existing compressed video bitstreams.

SUMMARY OF THE INVENTION

The present invention is directed to certain applications in which an existing compressed video bitstream is processed to generate an output bitstream that is different from the input bitstream. These applications may involve situations where the imagery represented in the bitstream is changed (such as when a logo is inserted into the imagery encoded in the bitstream) or where the size of the bitstream is changed (such as when the bit rate is reduced) or both.

According to embodiments of the present invention, the input bitstream is used as a reference to which the output bitstream is conformed. In particular, a controller compares measurements of the input and output bitstreams and adjusts the processing applied to the input bitstream so as to attempt to cause future measurements of the output bitstream to match future measurements of the input bitstream.

In one particular class of embodiments, the bitstream processing involves at least partially decoding the input bitstream, optionally applying one or more image processing functions to the decoded video data (e.g., logo insertion), followed by re-encoding of the video data to generate the output bitstream, where the output bitstream may (but does not have to) have a bit rate that differs from that of the input bitstream.

In one implementation, analogous buffer models are applied to both the input and output bitstreams to generate arrival margin values that are then compared to generate Quantization Re-scale Factors (QRFs) that are used to scale quantization data recovered from the input bitstream during the decoding process, where the scaled quantization data are then used to quantize DCT coefficients that are based on the input bitstream to generate quantized DCT coefficients for the output bitstream. The arrival margin for a frame is defined as the amount of time between when the last bit of a frame has entered the buffer and when that frame is removed from the buffer.

According to one embodiment, the present invention is a method for converting an input compressed video bitstream into an output compressed video bitstream, comprising the steps of (a) applying a process to convert the input bitstream into the output bitstream; (b) generating one or more input measurements from the input bitstream; (c) generating one or more output measurements from the output bitstream; and (d) comparing the one or more input measurements to the one or more output measurements to generate one or more control parameters that are used to adjust the process so that subsequent output measurements will more closely match subsequent input measurements.

BRIEF DESCRIPTION OF THE DRAWINGS

Other aspects, features, and advantages of the present invention will become more fully apparent from the following detailed description, the appended claims, and the accompanying drawings in which:

FIG. 3 shows pseudocode for one possible implementation of the processing performed by the rate control of FIG. 2 to determine the QRF value used by the re-encoder of FIG. 2 to generate output frame (n+1);

DETAILED DESCRIPTION

Figure 1:
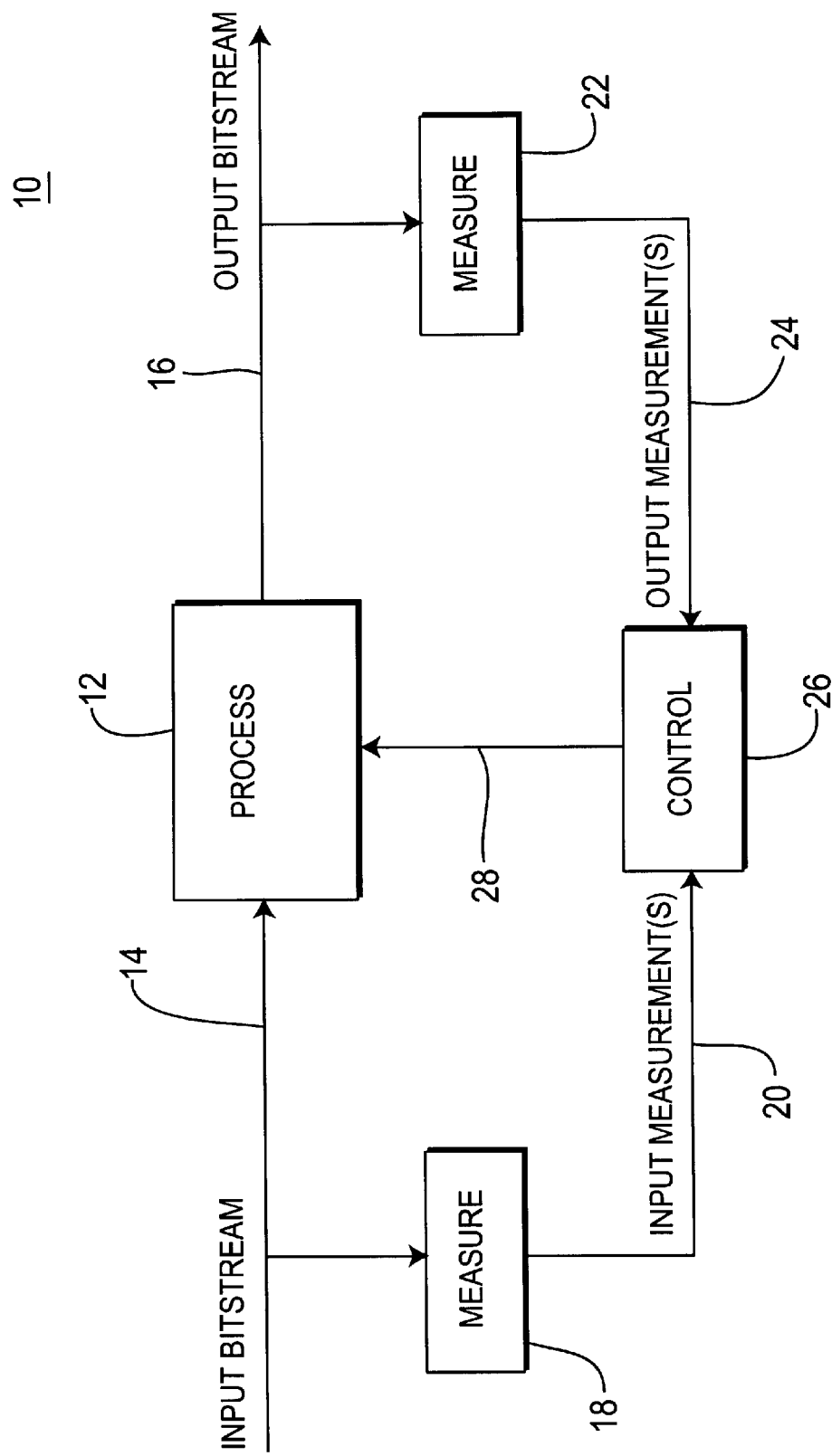
FIG. 1 shows a block diagram of a bitstream processing system according to a generalized version of the present invention.

FIG. 1 shows a block diagram of a bitstream processing system 10 according to a generalized version of the present invention. As shown in FIG. 1, process 12 is applied to input bitstream 14 to generate output bitstream 16, where the input and output bitstreams are compressed video bitstreams that differ from one another based on the processing applied by process 12. As suggested above, process 12 may be any suitable process that changes, for example, (1) the imagery represented in the input bitstream (such as when a logo is inserted into the imagery encoded in the bitstream) and/or (2) the bitstream bit rate.

As indicated in FIG. 1, input bitstream 14 is also connected to a measuring process 18 which generates one or more input measurements 20 based on the input bitstream. Similarly, output bitstream 16 is also connected to a measuring process 22 which generates one or more output measurements 24 based on the output bitstream in the same way that the input bitstream was measured. The input and output measurements are compared by a control process 26 which generates one or more control parameters 28 that are used to adjust process 12 so that subsequent output measurement(s) 24 will more closely match subsequent input measurement(s) 20.

As such, bitstream processing system 10 of FIG. 1 represents a scheme for converting an input bitstream into an output bitstream using closed-loop processing in which the feedback control signals are generated by comparing characteristics of the output bitstream to similar characteristics of the input bitstream. This differs from prior-art transcoding systems which operate either (1) open loop or (2) closed loop with feedback control signals that are generated independent of the input bitstream (e.g., by comparing the size of the output bitstream to the capacity of the output channel through which the output bitstream is to be transmitted).

Many different implementations of bitstream processing system 10 are possible. In one class of embodiments, process 12 involves decoding the input bitstream followed (eventually) by re-encoding to generate the output bitstream. According to this class of embodiments, the re-encoding process applies the same picture coding type, macroblock (MB) mode decisions, and motion vectors that were used when the input bitstream was originally encoded. In certain embodiments, the key difference between the original encoding of the input bitstream and the re-encoding during process 12 is that, for the re-encoding process, the quantization data recovered from the input bitstream are scaled prior to the quantization of DCT coefficient data, where the scaling of the quantization data is based on Quantization Re-scale Factors (QRFs) that are generated by control process 26 by comparing particular input and output measurements 20 and 24 generated by measuring processes 18 and 22 based on the input and output bitstreams, respectively. Depending on the implementation, different types of input and output measurements can be used to generate the QRF values.

In one embodiment, the number of bits actually used to encode a frame in the input bitstream is used as the target for encoding the corresponding frame in the output bitstream, appropriately scaled based on the desired ratio of the output bit rate to the input bit rate. In this embodiment, the actual input and output frame bitcounts identified in the input and output bitstreams, respectively, are the input and output measurements used by control process 26 to generate the QRF values. Depending on the implementation, subsequent picture target bitcounts may be modified by the current total overrun or underrun of all previous pictures.

Another embodiment of system 10 relies on the arrival margins for the input and output bitstreams as the measure used to drive the generation of QRF values by control process 26, where the arrival margin for a frame is defined as the amount of time between when the last bit of a frame has entered the buffer and when that frame is removed from the buffer. The following discussion provides further information on this particular embodiment of the present invention.

Controlling Quantization Based on Arrival Margins

Figure 2:
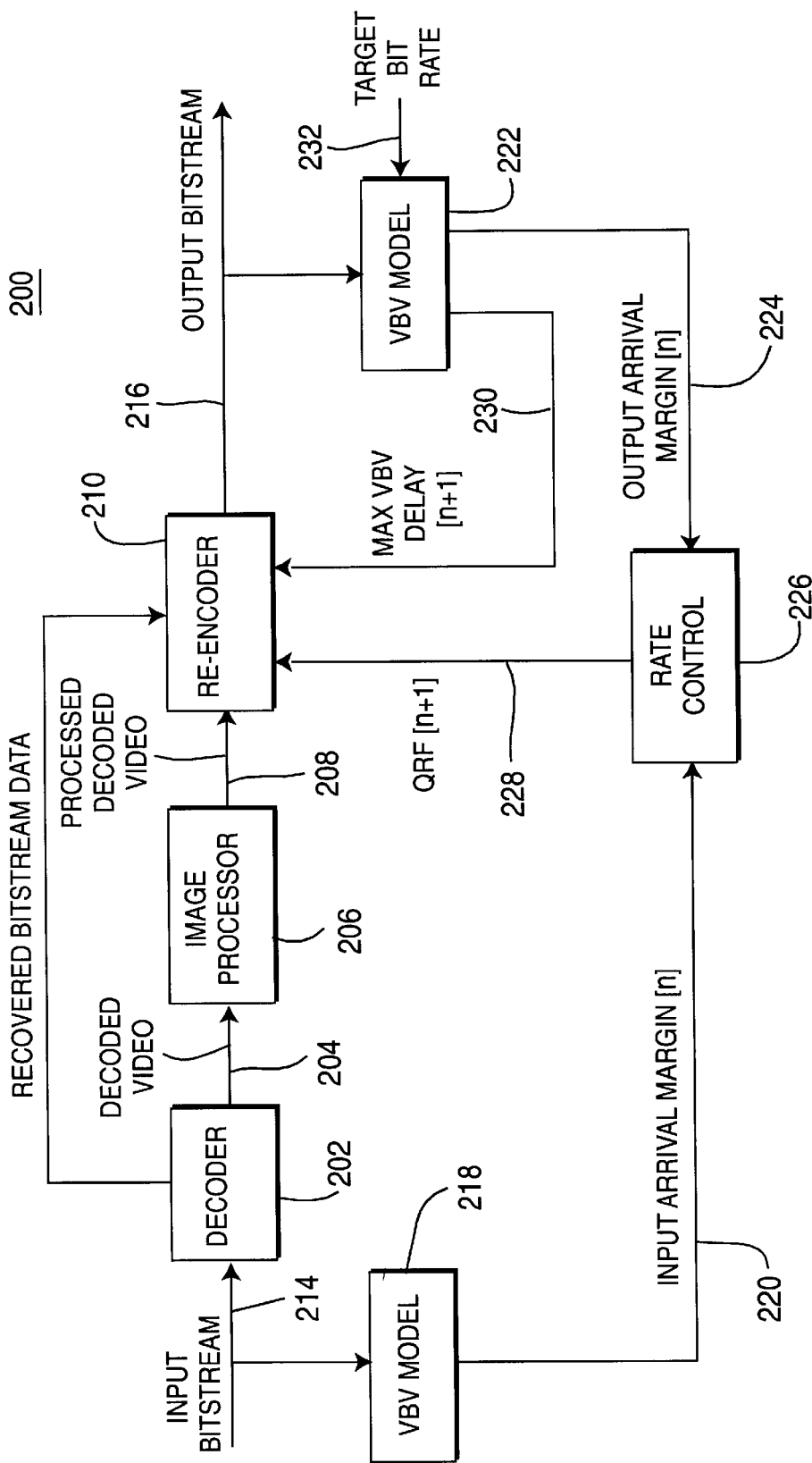
FIG. 2 shows a block diagram of a bitstream processing system according to a particular embodiment of the present invention.

FIG. 2 shows a block diagram of a bitstream processing system 200 according to a particular embodiment of system 10 of FIG. 1, in which feedback is used to match the timing of the output bitstream to the timing of the input bitstream. Relating system 200 to system 10, Input bitstream 214 is analogous to input bitstream 14;

Decoder 202, image processor 206, and re-encoder 210 correspond to a particular implementation of process 12;

Output bitstream 216 is analogous to output bitstream 16;

VBV models 218 and 222 are particular implementations of measuring processes 18 and 22, respectively;

Input and output arrival margins 220 and 224 are particular instances of input and output measurements 20 and 24, respectively;

Rate control 226 is a particular implementation of control process 26; and

QRF 228 is a particular instance of a control parameter 28, with maximum VBV delay 230 being an additional control parameter in system 200.

In this discussion, input and output bitstreams 214 and 216 are both assumed to be MPEG-2 bitstreams (although system 200 can be implemented for other video compression standards including applications in which the input and output bitstreams conform to two different standards). As an MPEG-2 bitstream, the input bitstream would typically have been originally generated using some or all of the following encoding operations:

Motion estimation is applied to an uncompressed video sequence (1) to determine whether to encode particular frames as intra (I) frames or predicted (P or B) frames, (2) to determine whether to encode particular macroblocks (MBs) in predicted frames as intra MBs or predicted MBs, and (3) to generate motion vectors used to encode the predicted MBs. The decisions as to whether to encode frames as I, P, or B frames define the GOP structure of the input bitstream, while the decisions as to how to encode particular macroblocks are referred to collectively as mode decisions.

Motion-compensated inter-frame differencing is performed to generate inter-frame pixel differences for predicted MBs.

A discrete cosine transform (DCT) is applied to each block of (a) the original pixel data for intra MBs (whether in intra frames or in predicted frames) and (b) the inter-frame pixel differences for predicted MBs.

The resulting DCT coefficients are quantized using quantizers defined by selected quantization matrices and quantization scale values to generate quantized DCT coefficients.

Run-length encoding and variable-length encoding are applied to the quantized DCT coefficients to generate encoded data for the input bitstream, which also includes, among other data, representations of the picture coding type, the mode decisions, the motion vectors used to encode predicted MBs, and the quantization matrices and scale values used to quantize the DCT coefficients.

As shown in FIG. 2, decoder 202 decodes input bitstream 214 to generate decoded video data 204. Depending on the particular implementation, this decoding may involve a full decoding of the input bitstream all the way to the pixel domain or only a partial decoding, e.g., to the DCT coefficient domain. Alternatively, it may involve a full decoding of certain data, but only a partial decoding of other data. For example, since I and P frames are potentially used to generate reference data for encoding other frames, bitstream data corresponding to I and P frames is preferably fully decoded to the pixel domain. Since, however, B frames are never used to generate reference data, for some applications (e.g., changes in bit rate without changing the imagery itself), bitstream data corresponding to B frames does not necessarily have to be fully decoded to the pixel domain. Rather, for these applications, B-frame data might only be decoded to the dequantized DCT coefficient level, thereby avoiding the computationally expensive forward and inverse DCT transforms for B-frame data.

Full decoding of the MPEG-2 input bitstream to the pixel domain typically involves the following decoding operations:

Undoing the variable-length and run-length encoding to recover quantized DCT coefficients;

Using quantizers recovered from the input bitstream to generate dequantized DCT coefficients;

Applying an inverse DCT transform to each block of dequantized DCT coefficients to recover either decoded pixel data or inter-frame pixel differences, depending on whether the picture coding type and mode decision information recovered from the input bitstream indicates that the corresponding MB was encoded as an intra MB or a predicted MB; and Applying motion-compensated inter-frame addition to the inter-frame pixel differences using motion vectors recovered from the input bitstream to generate decoded pixel data for the predicted MBs. While generating the decoded video data, decoder 202 preferably retains at least some of the data recovered from the input bitstream for use during the subsequent re-encoding processing by re-encoder 210. In one implementation, these data include the picture coding types, mode decisions, motion vectors, and quantization data recovered from the input bitstream. As shown in FIG. 2, these data are passed from decoder 202 to re-encoder 210, which uses the data to generate the output bitstream, as described in further detail below.

Before the re-encoding by re-encoder 210, however, optional image processing may be applied to the decoded video data by image processor 206 to generate processed video data 208. In one particular application of the present invention, image processor 206 inserts a logo into the video imagery, where the image processing is performed, for example, in the pixel domain using any suitable technique for logo insertion, such as pixel blending. For those applications in which no image processing is involved, image processor 206 may be omitted.

Depending on whether such image processing is performed, re-encoder 210 receives either (1) decoded video data 204 directly from decoder 202 or (2) processed video data 208 from image processor 206. In either case, re-encoder 210 re-encodes the received video data to generate output bitstream 216. In one implementation, re-encoder 210 uses the same picture coding types, mode decisions, and motion vectors that were used originally to generate input bitstream 214. In particular, re-encoder 210 encodes each macroblock in the received video data using the same encoding mode as the corresponding macroblock in input bitstream 214 using the same motion vector (for predicted MBs). Depending on the implementation, decoder 202 and re-encoder 210 may operate strictly on bitstream order or they may internally reorder the images for display order.

One key difference between the compression processing applied by re-encoder 210 and the compression processing performed originally to generate input bitstream 214 lies in the quantization of DCT coefficients. Instead of applying the same quantizers used to generate input bitstream 214, the quantization matrices and/or quantization scale values used during the quantization of DCT coefficients performed by re-encoder 210 are adjusted based on Quantization Re-scale Factors (QRFs) received by re-encoder 210 from rate control 226. The QRF values (other than those having a value of 1.0) change the degree of quantization applied to the DCT coefficients during re-encoding as compared to those used during the original encoding of the input bitstream.

In general, if a frame (n) in the output bitstream is too large (i.e., output frame (n) is represented using too many bits) as compared to the desired bit rate for the output bitstream (preferably taking into account the expected differing sizes of I, P, and B frames), then the arrival margin for output frame (n) will be smaller than the arrival margin for corresponding input frame (n) in the input bitstream. This corresponds to a situation where the output frame is later than the corresponding input frame, thereby creating an arrival margin error corresponding to the difference between the arrival margins of the corresponding input and output frames. Not only does this represent a situation in which the bit size of the output bitstream is larger than desired, but, if the output frames continue to be too large, the output arrival margin will continue to shrink with the accumulation of the arrival margin error and the danger exists that the output arrival margin will become negative which indicates an illegal underflow condition.

To avoid this situation, in a single-pass implementation of system 200 in which each frame is processed only once, rate control 226 increases the QRF value for the next frame (n+1), which in turn causes re-encoder 210 to increase the quantization level applied when quantizing the DCT coefficients for output frame (n+1), which will tend to reduce the number of bits used to represent frame (n+1) in the output bitstream. (Of course, in a multi-pass implementation, the adjustments to QRF can be made to the one or more subsequent passes for each frame.)

In one embodiment, the one or more quantization scale values recovered from the current input frame are multiplied by the current QRF value (generated based on the input and output versions of the previous frame) before the DCT coefficients for the current output frame are quantized during the re-encoding process. In another embodiment, the elements in the one or more quantization matrices recovered from the current input frame are multiplied by the current QRF value before those DCT coefficients are quantized. In yet another embodiment, both the quantization scale values and the quantization matrices are adjusted based on the current QRF value before quantization. For example, in one implementation, the quantization scale values and the quantization matrices are each multiplied by the square root of the current QRF value before being used to quantize the DCT coefficients.

In general, QRF values greater than one correspond to increased (i.e., more severe) quantization, while QRF values less than one correspond to decreased (i.e., less severe) quantization, compared to the quantization applied when the input bitstream was originally generated. As such, an increase in the QRF value increases the relative amount of quantization applied to the DCT coefficients. In preferred implementations of system 200, QRF values are always greater than or equal to one. As such, re-encoder 210 never decreases quantization levels below those used originally to generate the input bitstream. One motivation for this scheme is that information that was lost when the input bitstream was originally recovered can never be regained and lowering quantization levels below those used to generate the input bitstream will not provide any improvement in image quality. Alternative implementations of system 200, however, may support QRF values less than one. This may be advantageous in certain circumstances, such as when a logo or other imagery is inserted or combined with imagery recovered from the original input bitstream, to optimize image quality.

In preferred implementations, the quantizers resulting from adjustments based on QRF values are rounded to the nearest integers prior to quantization, so that the actual quantization of DCT coefficients can be performed using integer math, although the QRF values themselves are not limited to integers.

As indicated in FIG. 2, rate control 226 generates the QRF value 228 used by re-encoder 210 during its quantization processing for frame (n+1) based on a comparison of input arrival margin 220 (derived by VBV model 218 from input frame (n) in input bitstream 214) and output arrival margin 224 (derived by VBV model 222 from corresponding output frame (n) in output bitstream 216). The use of the QRF values by re-encoder 210 described above (i.e., to adjust quantization data) tends to drive the re-encoding process so that subsequent measurements of output arrival margin 224 will more closely match subsequent measurements of input arrival margin 220. In this way, in system 200, the input bitstream is used as a reference to which the output stream is conformed, with appropriate bit-rate scaling applied.

For MPEG-2 bitstreams, VBV models 218 and 222 are preferably based on requirements contained in MPEG-2 13818-2 Annex C (Normative). Annex C requires that an entire picture be removed from a decoder buffer at one moment. Annex C also requires that the buffer not underflow. As such, the last bit of a picture must arrive at the decoder buffer before the removal time. As used in this specification, the arrival margin for a picture is the amount of time between when the last bit of the picture has entered the VBV buffer and when the picture is removed from the buffer. According to Annex C, arrival margins must always be positive or zero (a negative value corresponds to an illegal underflow condition in which the entire picture does not arrive in time). One possible way to determine arrival margin for a picture is to determine the time when the last bit of the picture is added to the decoder buffer and then to wait until the picture is removed from the decoder buffer in order to calculate the arrival margin. Unfortunately, this technique would add undesirable delays to the process. In a preferred embodiment, arrival margin is predicted by maintaining a special VBV model, such as VBV models 218 and 222. According to this preferred embodiment, the VBV model can provide a predicted value for arrival margin even before the picture is added to the decoder buffer rather than having to wait until the picture is eventually removed. The preferred VBV model is described in further detail later in this specification in the section entitled "Preferred VBV Model."

FIG. 3 shows pseudocode for one possible implementation of the processing performed by rate control 226 of FIG. 2 to determine the QRF value used by re-encoder 210 of FIG. 2 to generate output frame (n+1). One goal of rate control process 26 is to increase either one of the buffer fullness or the frame delay to its maximum. Therefore, for each frame, the normalized buffer fullness (e.g., fullness/VbvSize) and the normalized delay (e.g., vbv_delay/45000) are measured, where he vbv_delay is the time between when a picture starts entering the buffer and when it is removed. The larger of the two values is driven towards a "targetPercentFullnessOrDelay," which may have a typical value of 0.90, corresponding to ninety percent of either a full buffer or the maximum vbv_delay.

Because buffer fullness and frame delay vary within each GOP and also between GOPs (typically in a sawtooth manner) and because the goal is to get the peaks of the fullness/delay to hit the target, a peak detector is applied to the fullness/delay values so that the error signal does not chatter. In one implementation, the peak detector remembers the previous peak and does not update its output until a specified number of subsequent calls have not resulted in a new peak. If that many calls go by without a new peak, then the peak value during that time interval is used as the new peak. The error in the current fullness/delay (ForD) is generated at line 4 of the pseudocode.

The error in the fullness/delay (ForD) is integrated as ForD_Integ at lines 5–8. This integration has separate gains for increasing and decreasing. These gains are typically set to slowly increase the QRF, but more quickly relax. For example, a typical value for gainErrorFullnessOrDelayIntegratorUp is 0.01, while a typical value for gainErrorFullnessOrDelayIntegratorDown is 0.08. The integrated fullness/delay error (ForD_Integ) is limited to non-negative values at line 9.

The difference (AMDiff) between the arrival margin (AMin) of input frame (n) (as derived from VBV model 218) and the arrival margin (AMout) of the corresponding output frame (n) (as derived from VBV model 222) is generated at line 14. This difference is integrated at line 15, as scaled by the gain factor gainArrivalMarginDifferenceIntegrator, which typically has a value of 0.5. The resulting integrated arrival margin difference (AMDiff_Integ) is limited to values greater than or equal to 1 at line 16.

Lines 18–23 address the situation where the arrival margin of the output frame (AMout) drops below a specified threshold "arrivalMarginPanicThreshold," which has a typical value of 0.040 seconds. When the output arrival margin (AMout) drops below "arrivalMarginPanicThreshold," a high-gain loop kicks in to increase quantization rapidly. The difference (AMPanic) between the arrival margin of the current output frame and a specified arrival margin panic threshold is calculated at line 19 and integrated at line 20 as (AMPanic_Integ), as scaled by the gain factor gainErrorArrivalMarginPanicIntegrator, which typically has a value of 1.0. Both of these values (AMPanic) and (AMPanic_Integ) are limited to non-negative values at lines 21–22. The effect of these values is to rapidly increase the output arrival margin for situations in which the input arrival margin is fairly small. In such cases, the decision is made to sacrifice video quality for a period of time in order to reach more comfortable levels of arrival margin in the output bitstream.

The QRF value to be used by re-encoder 210 to generate output frame (n+1) is generated at lines 25–31, where typical values for gainArrivalMarginDifferenceDirect, gainErrorArrivalMarginPanicDirect, and gainErrorFullnessOrDelayDirect are 5.0, 10.0, and 0.0, respectively. As explained previously, the QRF value is preferably limited to being greater than or equal to 1.0 at line 31.

In certain implementations of re-encoder 210, prior to quantization, the current QRF value is scaled according to the current picture coding type based on the following C++ equation:

$$QRF = QRF * QRFscale[picture\_coding\_type]$$

where picture_coding_type has the value 1, 2, or 3 depending on whether the current frame is an I, P, or B frame, and QRFscale[picture_coding_type] is preferably dynamically updated based upon the results of re-encoding previous pictures. In these embodiments, the QRF value is scaled to achieve relatively constant quality from picture to picture, independent of the particular picture coding types. The following pseudocode provides one possible implementation of an algorithm used to dynamically update the QRFscale parameters:

```
// initialization:
    for (i =1; i <= 3; i++)
        QRFscale[picture_coding_type] = 1;
// for each picture:
    bitcountRatio = bitcountBeforeRecoding / bitcountAfterRecoding;
    if (picture_coding_type == 'I')
        IbitcountRatio = bitcountRatio;
    QRFscale[picture_coding_type] *= (IbitcountRatio / bitcountRatio - 1) * k5 + 1;
//or:  QRFscale[picture_coding_type] += (IbitcountRatio / bitcountRatio - 1) * k5;
``` where k5 is a constant that in part determines the loop dynamics of this feedback system. A typical value for k5 is 0.5.

This QRF scaling procedure measures the ratio of the bitcount of a frame in the input bitstream to the bitcount of the corresponding re-encoded frame in the output bitstream. For a reduction in bit rate, this will nominally be the same as the ratio of the old bit rate to the new bit rate, e.g., 4 Mbps to 3 Mbps=1.333. The goal is for this ratio to be the same for all picture coding types. This procedure uses the ratio for the I frames as a reference to which the ratios of the B and P frames are compared. If the ratio of the P frames, for example, is larger than the ratio for the I frames, then the ratio of those ratios (to P, or I to B) is used to change the previous value of QRFscale, either by adding an error or by multiplying by (the error plus one). Note, in this procedure, that the QRFscale for I frames will always be 1.0.

As indicated in FIG. 2, in addition to receiving the QRF values 228 from rate control 226, re-encoder 210 also receives maximum VBV delay values 230 from VBV model 222. In a preferred embodiment, VBV model 222 can be queried for a maximum VBV delay value based on a given target bit rate, indicated in FIG. 2 as target bit rate 232, in order to limit the syntactic bitrate of the current frame in the output bitstream. Depending on the implementation, the target bit rate may be a constant representing the goal for output bitstream 216. In alternative implementations, the target bit rate 232 may vary over time based on other factors, such as those related to statistical multiplexing. Re-encoder 210 takes the maximum VBV delay value(s) 230 received from VBV model 222. These values may be used to replace the VBV delay values derived from the input bitstream, which determines the syntactic bitrate of the output bitstream. These same maximum VBV delay values are then used by VBV model 222 to derive the output arrival margins 224 for the output bitstream that are used by rate control 226 to generate the QRF values 228, as described above. In this way, the target bit rate is used to regulate the bit rate of the output bitstream up or down.

Preferred VBV Model

The preferred VBV model continuously monitors and corrects VBV buffer problems in any given stream, without knowledge of what preceding process may have caused a VBV problem. The VBV model monitors and corrects for both overflow and underflow conditions, as well as limiting the picture-by-picture bitrate Rn as required by Annex C of MPEG-2 13818-2.

The VBV model is updated on a picture-by-picture basis by "adding" one picture at a time to the model. Before a given picture is added to the model, the model may be examined to determine compliance limits for the next picture to be added so that it will not cause the buffer to overflow or to have excessive delay, or to cause excessive bitrate. Further, the model may be examined to predict whether the next picture will cause the model to underflow before the picture is added to the model, so that corrective action may be taken, e.g., substituting a modified or different frame, so that underflow is avoided.

The following characteristics apply to the VBV model:

1. The VBV model is maintained by adding discrete "pictures" to it.
2. The model may be examined before a picture is added to determine how to limit picture parameters so to avoid overflow, excessive delay, or excessive rate.
3. The model may be examined before a picture is added to determine if that picture will cause the model to underflow.

In certain implementations, if the model will underflow, corrective action may be taken until that picture will not cause the model to underflow.

Adding pictures one-by-one to the VBV model is performed by a process called AddPicture( ). Checking the state of the model to determine how to limit the vbv_delay so as to avoid overflow, excessive bitrate, and/or excessive delay is performed by a process called MaxVbvDelay( ). Checking the state of the model to determine if the proposed next picture will cause the model to underflow is performed by a process called ArrivalMargin( ). For those implementations that are able to perform corrective action to prevent underflow, when an underflow is predicted, possible corrective measures involve either inserting frames ahead of the current frame or replacing the current frame, depending on the picture_coding_type. The processes AddPicture( ), MaxVbvDelay( ), and ArrivalMargin( ) are described below in sections with corresponding titles.

AddPicture( )

Figure 4:
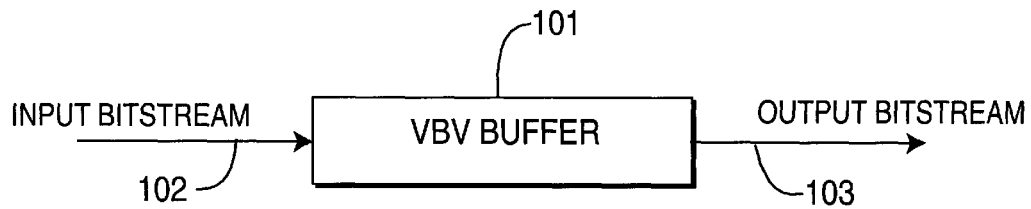
FIG. 4 shows a block diagram of a VBV buffer receiving an input bitstream at a buffer input and transmitting an output bitstream from a buffer output.

FIG. 4 shows a block diagram of VBV buffer 101 receiving an input bitstream 102 at a buffer input and transmitting an output bitstream 103 from a buffer output. Annex C defines the VBV buffer as an imaginary, theoretical, first-in, first-out (FIFO) buffer at the input of a bitstream decoder. Annex C defines the input process and the output process, which are independent except at startup.

The process AddPicture( ) modifies the state of the VBV buffer. The VBV model is defined in terms of input rates and input and output events that occur picture-by-picture (not bit-by-bit).

Buffer Output

Pictures are removed from the output of the VBV buffer one at a time at times defined by Annex C. When a picture is removed, all of the bits are removed at once (i.e., instantaneously). All of the bits for that picture must be present in the buffer before it is removed. This is another way of saying that the buffer must not underflow. The first picture is removed from the buffer at a time that depends on the input process, but subsequent removal intervals (i.e., the times between temporally adjacent removals) are determined independently of the input process.

Buffer Input

The VBV model initially begins with an empty buffer. Annex C defines two modes for input to the buffer: VBR mode and CBR mode. "CBR" and "VBR" historically stand for "constant bitrate" and "variable bitrate," respectively, although the bitrate in CBR mode is only constant while any given picture enters the buffer and may be quite different for the next picture. In VBR mode, bits enter at a rate that may alternate between a specified maximum rate Rmax and zero. In the present specification, these abbreviations are used more for convenience than for describing the actual behavior of the model.

VBR mode applies when the vbv_delay fields of the picture headers contain only values of 0xFFFF. In that case, bits enter the buffer at the rate indicated in the bit_rate_value field in the sequence header ("Rmax") until the buffer is full, whereupon bits stop entering the buffer until the buffer is no longer full (because a picture has been removed), whereupon bits once again enter the buffer at Rmax. Initially, the buffer fills until full, at which time the first picture is removed. Subsequent removal intervals are determined by a process that is not related to the input process.

CBR mode applies when the vbv_delay fields contain values not equal to 0xFFFF. In that case, each picture n enters the buffer at a rate Rn defined as the number of bits in that picture divided by the time it takes that picture to enter the buffer. The time each picture n begins to enter the buffer is the removal time of n minus the vbv_delay of n. The difference between the start time of picture n and the start time of picture (n+1) is the duration over which picture n enters the buffer, and forms the denominator of the bits/time rate equation. Note that the vbv_delay of picture (n+1) in part controls the rate at which picture n enters the buffer.

Figure 5:
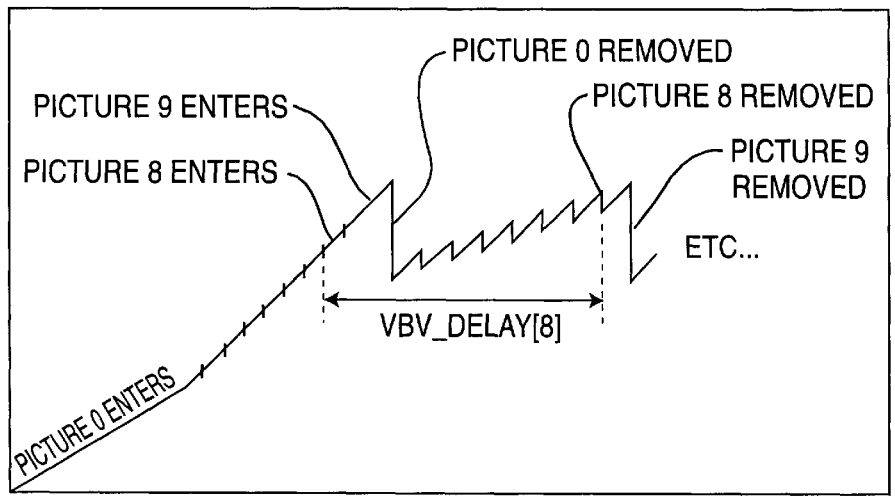
FIG. 5 shows a graphical representation of buffer fullness during the constant bitrate (CBR) mode.

FIG. 5 shows a graphical representation of buffer fullness during the CBR mode. The vbv_delay is the time between when a picture starts entering the buffer and when it is removed. Each picture enters the buffer at a rate Rn specific to that picture. The rate for picture 0 is shown in FIG. 5 as lower than the others as an example.

The state of the VBV model is defined by a series of input events, input rates, and output events. Additionally, in VBR mode, when the buffer reaches fullness, the input stops until a picture is removed; this is another type of event. Thus, the VBV buffer can be modeled on a picture-by-picture basis. Because of the varying Rn in CBR mode, the buffer is modeled picture-by-picture at the input (i.e., as pictures enter the buffer), while keeping track of the output process as required. This corresponds well to "sending" a picture; when a process "sends" a picture out, it "adds" it to its VBV model.

Figure 6:
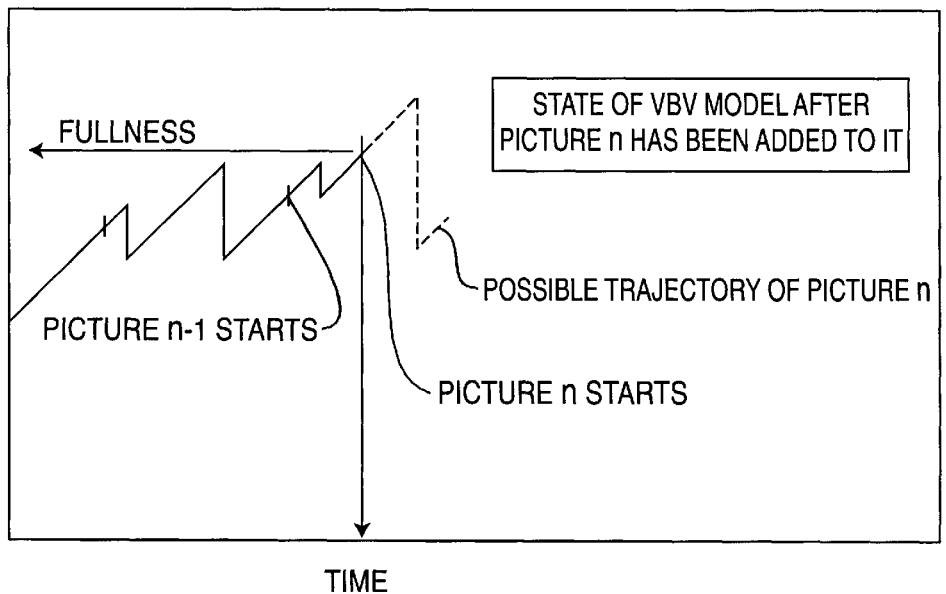
FIG. 6 shows a graphical representation of the state of the VBV model after picture n has been added to it.

FIG. 6 shows a graphical representation of the state of the VBV model after picture n has been added to it. After a picture n is added to the model by the process AddPicture( ), the model's state is updated to a time and fullness at the point when picture n is just starting to enter the buffer. This is because the vbv_delay from picture n+1 is used to determine the rate Rn for picture n. Adding a picture to the model causes the model to calculate the rate Rn for the picture previously added to it, and to "run in" that previous picture.

Consider that a "picture" contains the vbv_delay for that picture. The rate Rn for that picture is defined by Annex C as follows:

StartTimePrev=removalTimePrev−vbv_delayPrev;
StartTimeCurr=removalTimeCurr−vbv_delayCurr;
//rate equation from Annex C:
Rn=bitcountPrev/(StartTimeCurr−StartTimePrev);

where the suffixes Prev and Curr refer to two consecutive pictures (e.g., pictures n and n+1, respectively), StartTime is the time a picture begins to be added to the buffer, removalTime is the time that a picture is removed from the buffer, and bitcount is the number of bits in a picture. Since the determination of Rn for picture n depends on parameters of picture n+1, when picture n is added to the model, it cannot be "run into" the buffer because the rate cannot be determined for it until the next picture has arrived. Thus, after a given picture is "added" to the model, the model is "parked" at the time that picture begins to enter the buffer. Said another way, when a picture is added to the model, the previous picture is "run in" to the buffer, and the model ends up at the time the previous picture finishes entering the buffer, which is also the time the current picture will start entering the buffer.

The foregoing provides a way to implement Annex C in a model. The next section describes how to use the model to determine how to modify the bitstream to maintain compliance with Annex C.

MaxVbvDelay( )

Annex C requires in part that the VBV buffer not overflow, that the rate Rn never exceed Rmax (the bit_rate_value indicated in the sequence header), and that the vbv_delay not exceed 0xFFFE. (ATSC further restricts vbv_delay to a maximum value of 45000=0xAFC8.) All of these can be controlled picture-by-picture by determining an upper limit for the vbv_delay of the current picture, referred to as MaxVbvDelay.

When a picture is added to the model, its vbv_delay in part determines the rate Rn of the previous picture. As described in the previous section, five parameters are used to determine the rate Rn: the bitcount of the previous picture (n), the vbv_delay and removal time of the previous picture, and the vbv_delay and the removal time of the current picture.

Figure 7:
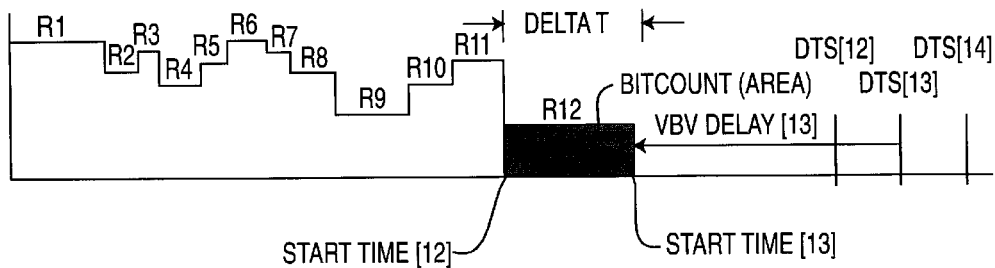
FIG. 7 shows a graphical representation of bitrate vs. time for a series of pictures entering the VBV buffer.

FIG. 7 shows a graphical representation of bitrate vs. time for a series of pictures entering the VBV buffer. The rate Rn of a picture is the bitcount divided by the delta time (deltaT) that is determined by vbv_delay values and picture removal time values (i.e., decode timestamps (DTSs)). Changing any one of these parameters will change Rn.

Rn may need to be adjusted in order to ensure that Rn does not exceed Rmax. Ensuring that Rn<Rmax is not the only compliance requirement. In addition, the buffer must not overflow, nor should any value of vbv_delay exceed some limit. Both of these constraints are also related to the value of Rn since reducing Rn reduces the delay and pulls the buffer fullness back from overflow. Rn may be changed by adjusting any of the five parameters upon which it is based.

The numerator in the equation used to determine Rn can be changed by changing the number of bits in the picture (i.e., dStar). The number of bits can be increased, e.g., by "zero padding" at the end of the picture, but that would increase Rn, and generally Rn needs to be lowered not increased. Reducing the number of bits in a picture is a much more difficult, compute-intensive task that usually involves decoding and recoding the image, or at least parsing and removing some DCT coefficients. In a preferred implementation, the number of bits in the picture (dStar) is assumed to be fixed.

The denominator consists of vbv_delay values from pictures n and n+1, and removal times from pictures n and n+1. Changing any of these will change Rn. The removal times are not negotiable; they are defined by the VBV buffer output process, and changing them would render the stream non-compliant. On the other hand, the vbv_delay values may be changed without necessarily rendering the stream non-compliant.

One possible way to adjust the rate Rn of picture n would be to adjust the vbv_delay of picture n. But changing the vbv_delay of picture n would also change the rate of picture n−1, which, presumably, was already adjusted by changing its vbv_delay value. This gets into a non-causal mess pretty quickly: the process would have to wait until the last picture and then work its way backwards through all the pictures. This is not practical for a realtime system, because it would result in an infinite delay. Instead, the vbv_delay of picture n+1 can be adjusted to control the rate Rn of picture n without requiring infinite recursion. Thus, the vbv_delay of picture n+1 is the preferred "knob" that is used to control the rate Rn of picture n.

Figure 8:
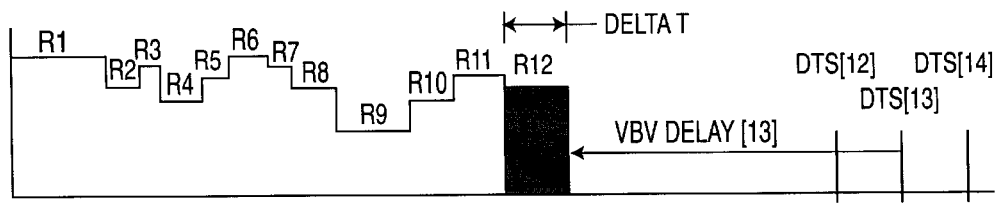
FIG. 8 is a graphical representation that demonstrates that increasing the vbv_delay of a picture causes the rate of the previous picture to increase.

FIG. 8 is a graphical representation that demonstrates that increasing the vbv_delay of a picture causes the rate of the previous picture to increase.

Figure 9:
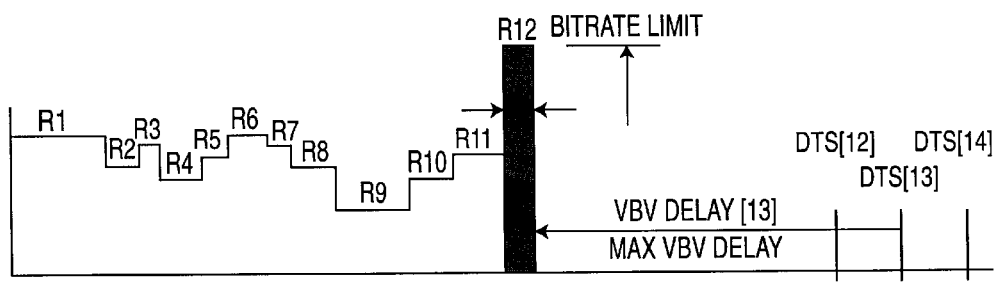
FIG. 9 is a graphical representation that demonstrates that there is some value of vbv_delay for a picture that makes the previous picture's rate Rn equal to some bitrate limit.

FIG. 9 is a graphical representation that demonstrates that there is some value of vbv_delay for a picture that makes the previous picture's rate Rn equal to some bitrate limit. This is a necessary but insufficient upper limit to the compliant values of vbv_delay, because, even though the rate is below some limit, that does not guarantee that the buffer will not overflow. There is also a fixed upper limit to vbv_delay (e.g., 45000 for ATSC). Thus, there are three constraints to the maximum value of vbv_delay.

In general, as the vbv_delay of picture n+1 increases, so does the rate Rn of picture n. There is some value of this vbv_delay that will give a value of Rn equal to some rate limit such as Rmax. This rate limit may be computed directly by algebraic manipulation of the rate equation, as follows:

vbv_delay[n+1]=removalTime[n+1]−dStar/bitrateLimit−removalTime[n]+vbv_delay[n];

but this is not sufficient, because it does not consider the possibility that even this limited rate might cause the buffer to overflow. As described below, the process MaxVbvDelay( ) computes the largest value of vbv_delay that can be used with picture n+1 and still maintain buffer compliance.

The process MaxVbvDelay( ) determines this value by determining the largest rate, equal to or less than some bitrate limit, that may be used with picture n (not n+1) and still maintain compliance. Once this rate has been determined, the duration of picture n may be computed, and, from that duration, the vbv_delay value for picture n+1 may be determined.

To determine the maximum rate, the question is: Given the current state of the vbv model, what is the maximum rate (equal to or less than some upper limit) at which bits can be added to the buffer until all the previously-added pictures have been removed and avoid overflowing the buffer?

The state of the buffer is maintained by the VBV model and includes the size and removal time of all the pictures that have entered the buffer but have not been removed. This information is stored in an array called pictureList[ ]. pictureList[0] represents the oldest picture in the buffer, i.e., the one that will be removed next. The following terms are defined:

time: the current time of the model; that is, the time when picture n begins to enter the buffer, where picture n is the picture most-recently added to the model with the process AddPicture( ).

fullness: the number of bits in the buffer at time 'time' vbvSize: the bit capacity of the VBV model's buffer, as stamped in the sequence header of the bitstream bitrateLimit: the maximum bitrate allowed, either as stamped in the stream, or a lower value requested by the user.

bitrateRnMax: the maximum rate that will not cause overflow

Figure 10:
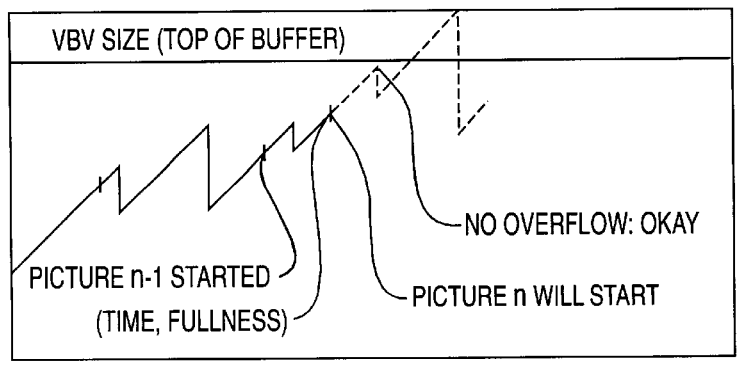
FIG. 10 shows a graphical representation of buffer fullness as a function of time, in which picture n was most-recently added to the model, but not yet run in because the model needs the vbv_delay for picture n+1 to determine the rate Rn for picture n.

FIG. 10 shows a graphical representation of buffer fullness as a function of time, in which picture n was most-recently added to the model, but not yet run in because the model needs the vbv_delay for picture n+1 to determine the rate Rn for picture n. To determine the MaxVbvDelay for picture n+1, the maximum rate for picture n that will not cause the buffer to overflow needs to be determined.

Figure 11:
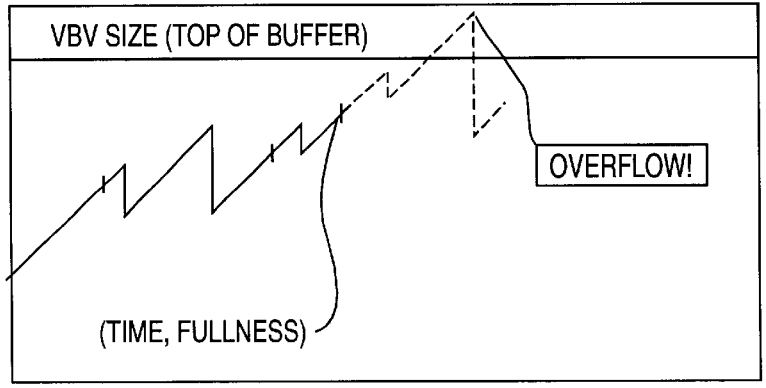
FIG. 11 shows a graphical representation of buffer fullness as a function of time, in which the process MaxVBvDelay( ) considers what the state of the model would be at the time each of the pictures currently in the buffer would be removed.

FIG. 11 shows a graphical representation of buffer fullness as a function of time, in which the process MaxVBvDelay( ) considers what the state of the model would be at the time each of the pictures currently in the buffer would be removed. Here, at the time the first (oldest) picture is to be removed, the buffer would not have overflowed at the rate selected (bitrateLimit). But, at bitrateLimit, too many bits will have gone in by the time the second picture is removed, so bitrateLimit is too high a rate to use as Rn.

Figure 12:
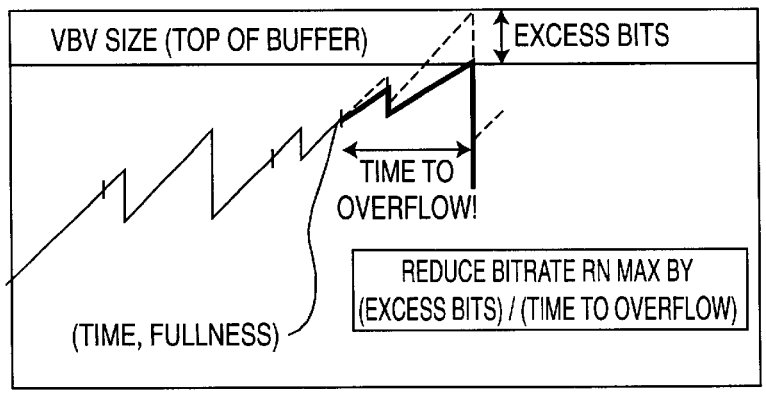
FIG. 12 shows a graphical representation of buffer fullness as a function of time, in which the bitrate is reduced by the excess bits divided by the time duration from the start of picture n.

FIG. 12 shows a graphical representation of buffer fullness as a function of time, in which the bitrate is reduced by the excess bits divided by the time duration from the start of picture n. This will cause the buffer trajectory to "kiss" the top of the buffer without overflowing. This process is repeated for each picture that is currently in the buffer, successively reducing the bitrate as necessary.

The following is C++ code that loops over the pictures in the buffer until it determines the fastest rate at which bits may enter the VBV buffer until all pictures have been removed, and yet not overflow the buffer:

```
// Start out optimistically at bitrateLimit
int64 bitrateRnMax = bitrateLimit
int64 tempFull;                    // placed to temporarily store a running buffer fullness
int64 bitsRemovedSoFar = 0;        // count of the bits of pictures that are removed
int64 bitsAddedSoFar = 0;          // count of the bits added as pictures are removed
int32 ii;                          // index that points at each picture currently in the buffer
// Time is measured in units of cycles of 27 MHz; bitrate is measured in bits/second, not bits per cycle.
// For each picture still in the buffer, run bits into buffer up to removal time of that picture, and see if and by
// and how much it would have overflowed. Make adjustments, and then consider next picture in buffer.
for (ii=0;, ii < picturesInList; ii+ +)
{
    // Figure by how many bits it would have overflowed at bitrateRnMax:
    bitsAddedSoFar = ((pictureList[ii].removalTime - time)// duration since start
        * bitrateRnMax / 27000000);          // times the current reduced bitrate
    // Note: LargestVbvSize(ii) means "largest vbv size value associated with each of the pictures
    // remaining in the buffer starting from picture ii"
    tempFull = fullness + bitsAddedSoFar - bitsRemovedSoFar;
    if ( tempFull > LargestVbvSize(ii) )
    {
        // Reduce the rate by the overage amount divided by the total time to this point:
        bitrateRnMax -= (tempFull - LargestVbvSize(ii) ) * 27000000
            / (pictureList[ii].removalTime - time);
    }
    bitsRemovedSoFar += pictureList[ii].pictureDataBits;
}
```

When this procedure completes, bitrateRnMax contains the highest bitrate that is equal to or less than bitrateLimit and will not cause the buffer to overflow. This value may be used to compute the corresponding maximum vbv_delay value for picture n+1. If picture n enters the buffer at bitrateRnMax and has dStar bits, then the amount of time it takes for picture n to enter the buffer is as follows:

durationN=dStar/bitrateRnMax; //time for picture n to enter the buffer

Picture n will finish entering the buffer at the time finishN as follows:

finishN=time+durationN;

where time is the current time state of the model, which is the time picture n starts entering the buffer.

Picture n+1 begins entering the buffer when picture n has finished entering the buffer, i.e., at finishN. The vbv_delay of picture n+1 is defined to be its removal time (removalTimeNPlusOne, which is well-defined in Annex C) minus its start time (finishN), as follows:

max_vbv_delay=removalTimeNPlusOne−finishN;

A value of vbv_delay must not be used that exceeds some system maximum. MPEG requires it to be less than 0×FFFF (65535); ATSC further requires it to be 45000 or less. Thus, if (max_vbv_delay>SYSTEM_VBV_DELAY_LIMIT)
   max_vbv_delay=SYSTEM_VBV_DELAY_LIMIT;

This is the largest value of vbv_delay that may be used with picture n+1 and still have a compliant bitstream.

This is the value returned by the process MaxVbvDelay( ).

The preceding algorithm requires information about picture n to determine a maximum vbv_delay value for picture n+1. A different algorithm must be used to determine a max vbv_delay for the first picture. Given that the first picture contains a sequence header (which contains a bit_rate_ value (Rmax) and the vbv buffer size (vbvSize), a maximum vbv_delay can be computed as the amount of time required to completely fill the buffer at the rate Rmax, as follows:

firstMaxVbvDelay=vbvSize/Rmax;

This, too must not exceed the system limit, so:

if (firstMaxVbvDelay>SYSTEM_VBV_DELAY_LIMIT)
   firstMaxVbvDelay=SYSTEM_VBV_DELAY_LIMIT;

This generates the MaxVbvDelay limit for the first picture.

If the value generated by MaxVbvDelay is used to limit the values of vbv_delay in a stream, that stream will never overflow the VBV model's buffer, nor will any picture's bitrate exceed the bitrateLimit used in the algorithm above. This limit may either be the rate that appears in the bitstream's sequence header, or a lower rate provided by the user who may wish to modulate the rate of a bitstream, for example, to perform statistical multiplexing. The following procedure can be used to limit the vbv_delay values:

```
while ( anotherPictureIsAvailable )
{
    max = vbvmodel.MaxVbvDelay( nextPicture, bitrateLimit );
    if (nextPicture.vbv_delay > max)
            nextPicture.vbv_delay = max;
    vbvmodel.AddPicture( nextPicture );      // commit the picture to
                                             the model.
}
```

A variation on the above procedure of limiting the vbv_delay values is instead to set the vbv_delay values to the maximum, unconditionally, as follows:

```
while ( anotherPictureIsAvailable )
{
    max = vbvmodel.MaxVbvDelay( nextPicture, bitrateLimit );
    nextPicture.vbv_delay = max;    // always use max! maximizes
                                    rate/fullness/delay
    vbvmodel.AddPicture( nextPicture );  // commit the picture to
                                         the model.
}
```

This has the additional behavior of always using the highest bitrate possible, which increases the vbv_delay and the buffer fullness of a given stream as high as it can go while still maintaining compliance. This has the benefit of providing extra margin against underflow.

Figure 13:
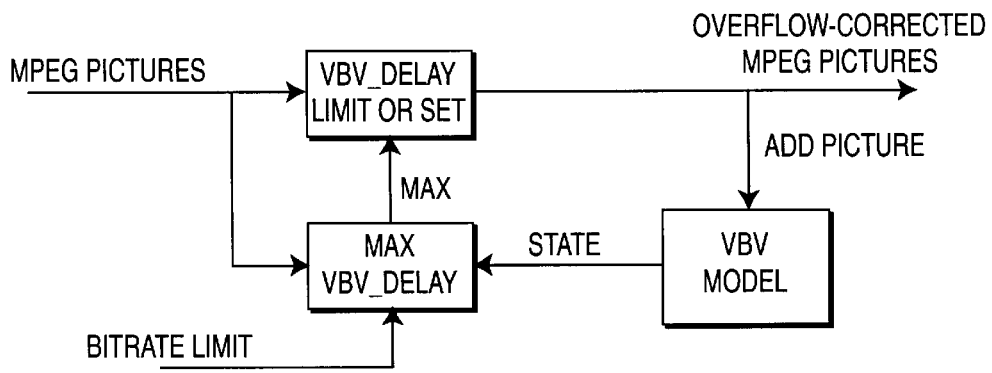
FIG. 13 shows a block diagram of the configuration of a system in which the MaxVbvDelay algorithm uses the state of the VBV model to determine the maximum vbv_delay that may be used on the next picture, before that picture is added to the model.

FIG. 13 shows a block diagram of the configuration of a system in which the MaxVbvDelay algorithm uses the state of the VBV model to determine the maximum vbv_delay that may be used on the next picture, before that picture is added to the model.
ArrivalMargin( )

The procedures described above will correct any MPEG stream for VBV buffer overflow, but will not correct for underflow. In fact, it may indirectly cause an underflow by assuring that the stream not exceed a certain bitrateLimit.

Underflow occurs when a picture cannot completely enter the VBV buffer before the time comes for that picture to be removed (i.e., removal time or the Decode Time Stamp (DTS)). This generally occurs when there are too many bits used to represent an image at a given bitrate. Reducing the number of bits in an image can be a very compute-intensive process, involving decoding and re-encoding the picture.

The process ArrivalMargin( ) predicts whether the next picture to be added to the VBV model will "make it there in time" before that picture is added to the model, i.e., in time to do something about it. This process reports the amount of time (i.e., the arrival margin) between when the proposed next picture will finish entering the VBV buffer and when that picture must be removed from the buffer for decoding. If the picture will get there in time, the arrival margin is positive. A negative arrival margin indicates that the picture will underflow if it is added to the VBV model. The process ArrivalMargin(picture) receives the proposed picture and calculates that picture's arrival margin as follows.

A temporary, "trial" copy of the VBV model is made. Using this copy, the MaxVbvDelay for the proposed picture is determined by making a call to the process MaxVbvDelay( ). This max value is used with the proposed picture, and the proposed picture is added to the trial model. The trial model is now "parked" at the start of the proposed picture. Once again the process MaxVbvDelay( ) is called using an imaginary next picture to get the max vbv_delay for that picture (to set the rate of the proposed picture). Given the rate of the proposed picture and the number of bits in the proposed picture, it can be determined how long it will take to run this picture into the model. This duration is added to the current time of the trial model, and then that sum is subtracted from the removal time (i.e., DTS) of the proposed picture. This is the arrival margin.

If the arrival margin is negative, the proposed picture will cause the VBV buffer to underflow. With this information, action may be taken to modify the stream so as to avoid this non-compliant situation. In a preferred implementation, a number of "blank" frames are inserted ahead of the proposed picture, or the proposed picture is replaced with a blank frame. The former is done when the proposed picture is not a B frame, and the latter is done when the proposed picture is a B frame.

For example, when the proposed picture is an I frame and its arrival margin is negative, a synthetic P frame can be generated that contains very little data. An example of this is a P frame that contains no DCT coefficients and all motion vectors are zero. This effectively tells the decoder to repeat the previous anchor. This improves the arrival margin characteristic of the proposed picture by delaying its removal time (DTS) by another frame period, e.g., 33 msec. Given that the blank frame contains very little data and can be sent in substantially less than one frame display time, this will increase the arrival margin.

After the blank P frame is inserted (and added to the VBV model), the process is repeated to consider once again the proposed frame, measuring its arrival margin. If the arrival margin is still negative, another blank P frame is sent, increasing the arrival margin further. This process is repeated until the arrival margin is no longer negative.

If the picture with a negative arrival margin is a B frame, that frame is simply discarded and replaced with a blank B frame. If this blank B frame can be sent in less than one frame display time, this will prevent underflow.

Figure 14:
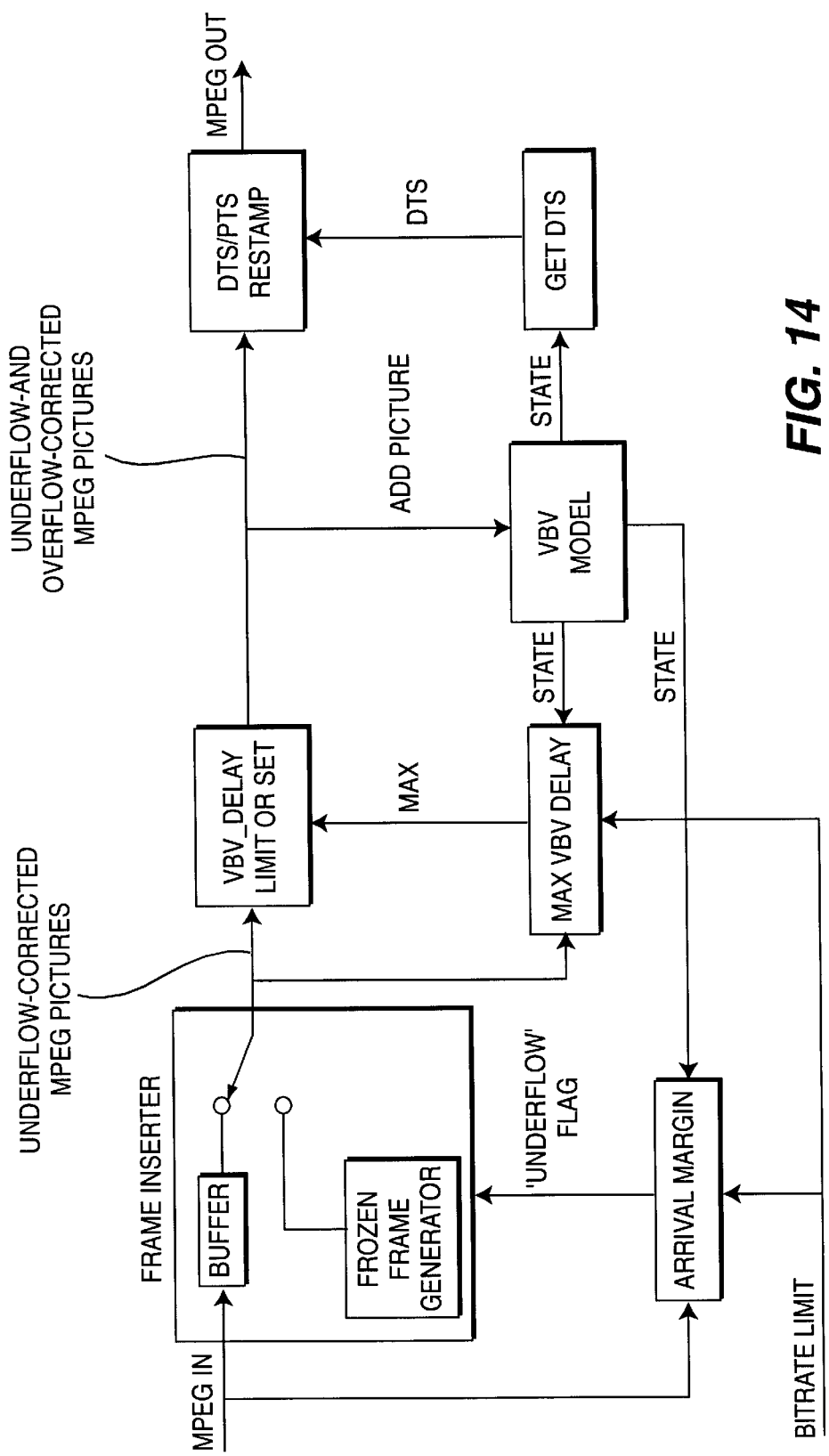
FIG. 14 shows a block diagram of a complete VBV buffer management system.

FIG. 14 shows a block diagram of a complete VBV buffer management system. The process ArrivalMargin( ) computes the amount of time between when the next picture will finish entering the VBV buffer and when it must be removed. If this value is negative, it means the picture will underflow. In that case, the Frame Inserter either replaces the frame or inserts extra frames before it. P or B frames that have no DCT information can be sent in a very short period of time.

Although the present invention has been described in the context of a re-encoder that generates the output bitstream by re-using the picture coding types, mode decisions, motion vectors, and quantization data (albeit scaled by QRF) that were recovered from the input bitstream, the invention is not so limited. In alternative embodiments, some or all of these data may be selected by the re-encoder. Furthermore, although the present invention has been described in the context in which quantization data is scaled based on control parameters (i.e., QRF values) generated by comparing the input and output arrival margins, the invention is not so limited. As suggested previously, the rate control may be based on measurements of the input and output bitstreams other than arrival margin such as bitcount and picture duration (i.e., time between consecutive picture headers in the transport stream, for example, based on the number of transport packets between packets that contain picture headers). Moreover, instead of scaling quantization data, the control parameters may be used to adjust the re-encoding process in other ways, such as DCT coefficient discarding. Similarly, although the present invention has been described in the context of MPEG-2 encoding, those skilled in the art will understand that the present invention can be applied in the context of other video compression algorithms.

Those skilled in the art will recognize that, in general terms, the architecture of FIG. 1 may be said to correspond to the application of a feedback loop filter to control process 12. In such an architecture, the output of a process is compared to some reference, and the resulting comparison is filtered to provide a control signal that controls the process. In the particular implementation of FIG. 1, the reference is derived from input bitstream 14 (i.e., input measurement(s) 20), and the output (i.e., output measurement(s) 24) is compared to that reference by control process 26, which also filters the resulting comparisons between the input and output measurements to generate control parameters 28 that control process 12.

Although the present invention has been described in the context of a video frame as a single entity, those skilled in the art will understand that the invention can also be applied in the context of interlaced video streams and associated field processing. As such, unless clearly inappropriate for the particular implementation described, the term "frame," especially as used in the claims, should be interpreted to cover applications for both video frames and video fields.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for converting an input compressed video bitstream into an output compressed video bitstream, comprising the steps of:

(a) applying a process to convert the input bitstream into the output bitstream;

(b) generating one or more input measurements from the input bitstream;

(c) generating one or more output measurements from the output bitstream; and (d) comparing the one or more input measurements to the one or more output measurements to generate one or more control parameters that are used to adjust the process so that subsequent output measurements will more closely match subsequent input measurements, wherein:

step (a) comprises the steps of:

(1) at least partially decoding the input bitstream to generate at least partially decoded video data; and (2) re-encoding video data corresponding to the decoded video data to generate the output bitstream, wherein the one or more control parameters are used to adjust the re-encoding;

the one or more control parameters comprise quantization re-scale factor (QRF) values;

the re-encoding comprises quantization of DCT coefficients generated based on the input bitstraem;

quantizers used to quantize the DCT coefficients are generated based on quantization data recovered from the input bitstream and the QRF values; and the QRF values are generated based on comparing arrival margins of corresponding frames in the input and output bitstreams.

2. The invention of claim 1, wherein step (a)(1) further comprises the step of applying image processing to the decoded video data to alter imagery represented in the decoded video data prior to the re-encoding of step (a)(2).

3. The invention of claim 1, wherein quantization matrices recovered from the input bitstream are adjusted based on the QRF values prior to the quantization.

4. The invention of claim 1, wherein quantization scale values recovered from the input bitstream are adjusted based on the QRF values prior to the quantization.

5. The invention of claim 1, wherein both quantization matrices and quantization scale values recovered from the input bitstream are adjusted based on the QRF values prior to the quantization.

6. The invention of claim 5, wherein both the quantization matrices and the quantization scale values recovered from the input bitstream are multiplied by the square root of the QRF values prior to the quantization.

7. The invention of claim 1, wherein the QRF values are scaled based on scale factors corresponding to picture coding type prior to the quantization.

8. The invention of claim 1, wherein steps (b)–(d) correspond to the implementation of a feedback loop filter that generates the one or more control parameters that are used to adjust the process of step (a).

9. The invention of claim 1, wherein:

the one or more input measurements includes arrival margin of frames in the input bitstream;

the one or more output measurements includes arrival margin of frames in the output bitstream; and the arrival margins of corresponding frames in the input and output bitstreams are compared to generate the one or more control parameters that are used to adjust the process so that subsequent output arrival margins will more closely match subsequent input arrival margins.

10. The invention of claim 9, wherein step (a) comprises the steps of:

(1) at least partially decoding the input bitstream to generate at least partially decoded video data;
(2) applying image processing to the decoded video data to alter imagery represented in the decoded video data; and
(3) re-encoding video data corresponding to the decoded video data to generate the output bitstream, wherein the one or more control parameters are used to adjust the re-encoding.

11. The invention of claim 1, wherein:
the one or more input measurements includes actual bitcount of frames in the input bitstream;
the one or more output measurements includes actual bitcount of frames in the output bitstream; and
the actual bitcounts of corresponding frames in the input and output bitstreams are compared to generate the one or more control parameters that are used to adjust the process so that subsequent output arrival margins will more closely match subsequent input arrival margins.

12. The invention of claim 1, wherein:
the one more input measurements includes picture durations in the input bitstream;
the one or more output measurements includes picture durations in the output bitstream; and
the corresponding picture durations in the input and output bitstreams are compared to generate the one or more control parameters that are used to adjust the process so that subsequent output arrival margins will more closely match subsequent input arrival margins.

13. A machine-readable medium, having encoded thereon program code, wherein, when the program code is executed by a machine, the machine implements a method for converting an input compressed video bitstream into an output compressed video bitstream, comprising the steps of:
(a) applying a process to convert the input bitstream into the output bitstream;
(b) generating one or more input measurements from the input bitstream;
(c) generating one or more output measurements from the output bitstream; and
(d) comparing the one or more input measurements to the one or more output measurements to generate one or more control parameters that are used to adjust the process so that subsequent output measurements will more closely match subsequent input measurements, wherein:
step (a) comprises the steps of:
(1) at least partially decoding the input bitstream to generate at least partially decoded video data; and
(2) re-encoding video data corresponding to the decoded video data to generate the output bitstream, wherein the one or more control parameters are used to adjust the re-encoding;
the one or more control parameters comprise quantization re-scale factor (QRF) values;
the re-encoding comprises quantization of DCT coefficients generated based on the input bitstream;
quantizers used to quantize the DCT coefficients are generated based on quantization data recovered from the input bitstream and the QRF values; and
the QRF values are generated based on comparing arrival margins of corresponding frames in the input and output bitstreams.

14. A method for converting an input compressed video bitstream into an output compressed video bitstream, comprising the steps of:
(a) applying a process to convert the input bitstream into the output bitstream;
(b) generating one or more input measurements from the input bitstream;
(c) generating one or more output measurements from the output bitstream; and
(d) comparing the one or more input measurements to the one or more output measurements to generate one or more control parameters that are used to adjust the process so that subsequent output measurements will more closely match subsequent input measurements, wherein step (a) comprises the steps of:
(1) at least partially decoding the input bitstream to generate at least partially decoded video data; and
(2) re-encoding video data corresponding to the decoded video data to generate the output bitstream, wherein the one or more control parameters are used to adjust the re-encoding;
the one or more control parameters comprise quantization re-scale factor (QRF) values;
the re-encoding comprises quantization of DCT coefficients generated based on the input bitstream;
quantizers used to quantize the DCT coefficients are generated based on quantization data recovered from the input bitstream and the QRF values; and
both quantization matrices and quantization scale values recovered from the input bitstream are multiplied by the square root of the QRF values prior to the quantization.

15. A method for converting an input compressed video bitstream into an output compressed video bitstream, comprising the steps of:
(a) applying a process to convert the input bitstream into the output bitstream;
(b) generating one or more input measurements from the input bitstream;
(c) generating one or more output measurements from the output bitstream; and
(d) comparing the one or more input measurements to the one or more output measurements to generate one or more control parameters that are used to adjust the process so that subsequent output measurements will more closely match subsequent input measurements, wherein:
the one or more input measurements includes arrival margin of frames in the input bitstream;
the one or more output measurements includes arrival margin of frames in the output bitstream; and
the arrival margins of corresponding frames in the input and output bitstreams are compared to generate the one or more control parameters that are used to adjust the process so that subsequent output arrival margins will more closely match subsequent input arrival margins.

16. The invention of claim 15, wherein step (a) comprises the steps of:
(1) at least partially decoding the input bitstream to generate at least partially decoded video data;
(2) applying image processing to the decoded video data to alter imagery represented in the decoded video data; and
(3) re-encoding video data corresponding to the decoded video data to generate the output bitstream, wherein the one or more control parameters are used to adjust the re-encoding.

17. A method for converting an input compressed video bitstream into an output compressed video bitstream, comprising the steps of:
- (a) applying a process to convert the input bitstream into the output bitstream;
- (b) generating one or more input measurements from the input bitstream;
- (c) generating one or more output measurements from the output bitstream; and
- (d) comparing the one or more input measurements to the one or more output measurements to generate one or more control parameters that are used to adjust the process so that subsequent output measurements will more closely match subsequent input measurements, wherein:

the one or more input measurements includes actual bitcount of frames in the input bitstream;

the one or more output measurements includes actual bitcount of frames in the output bitstream; and the actual bitcounts of corresponding frames in the input and output bitstreams are compared to generate the one or more control parameters that are used to adjust the process so that subsequent output arrival margins will more closely match subsequent input arrival margins.

18. A method for converting an input compressed video bitstream into an output compressed video bitstream, comprising the steps of:
- (a) applying a process to convert the input bitstream into the output bitstream;
- (b) generating one or more input measurements from the input bitstream;
- (c) generating one or more output measurements from the output bitstream; and
- (d) comparing the one or more input measurements to the one or more output measurements to generate one or more control parameters that are used to adjust the process so that subsequent output measurements will more closely match subsequent input measurements, wherein:

the one or more input measurements includes picture durations in the input bitstream;

the one or more output measurements includes picture durations in the output bitstream; and the corresponding picture durations in the input and output bitstreams are compared to generate the one or more control parameters that are used to adjust the process so that subsequent output arrival margins will more closely match subsequent input arrival margins.

\* \* \* \* \*

UNITED STATES PATENT AND TRADEMARK OFFICE
CERTIFICATE OF CORRECTION

PATENT NO. : 6,763,067 B2 Page 1 of 1
DATED : July 13, 2004
INVENTOR(S) : Robert N. Hurst It is certified that error appears in the above-identified patent and that said Letters Patent is hereby corrected as shown below:

Column 20,
Line 23, replace "bitstraem" with -- bitstream --.

Signed and Sealed this

Twenty-first Day of September, 2004

JON W. DUDAS
*Director of the United States Patent and Trademark Office*